US008965357B2

(12) United States Patent
Dimou et al.

(10) Patent No.: US 8,965,357 B2
(45) Date of Patent: Feb. 24, 2015

(54) HANDLING RADIO LINK FAILURE IN A RADIO COMMUNICATIONS NETWORK

(75) Inventors: Konstantinos Dimou, Stockholm (SE); Wei Zhao, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1098 days.

(21) Appl. No.: 12/978,007

(22) Filed: Dec. 23, 2010

(65) Prior Publication Data

US 2012/0083262 A1 Apr. 5, 2012

Related U.S. Application Data

(60) Provisional application No. 61/306,757, filed on Feb. 22, 2010.

(51) Int. Cl.
*H04W 24/00* (2009.01)
*H04W 36/00* (2009.01)

(52) U.S. Cl.
CPC .................... *H04W 36/0055* (2013.01)
USPC .......................... 455/423; 455/436

(58) Field of Classification Search
None
See application file for complete search history.

(56) References Cited

U.S. PATENT DOCUMENTS

| 2007/0218896 | A1* | 9/2007 | Altshuller et al. | 455/432.1 |
| 2008/0008212 | A1* | 1/2008 | Wang et al. | 370/503 |
| 2009/0046573 | A1* | 2/2009 | Damnjanovic | 370/216 |
| 2011/0170516 | A1* | 7/2011 | Hu et al. | 370/331 |

OTHER PUBLICATIONS

Alcatel-Lucent, et al., "4C-HSDPA Radio Link Failure Enhancement," 3GPP TSG-RAN WG1 Meeting #69bis R2-102058, Apr. 12-16, 2010, pp. 1-3, Beijing, China.
CATT, "RLF Report Definition Based on MRO Stage-2 Solution," 3GPP TSG-RAN WG3 Meeting #66, R3-092843, Nov. 9-13, 2009, pp. 1-7, Jeju, Korea.
Huawei, "RLF in Enhanced Cell_FACH," 3GPP TSG-RAN WG2 Meeting #62, R2-082287, May 5-9, 2008, pp. 1-2, Kansas City, US.
Nokia Siemens Networks, "UE-Originated RLF Reports for Correct RLF Reason Detection," 3GPP TSG-RAN WG3 Meeting #65bis, R3-092501, Oct. 12-15, 2009, pp. 1-3, Miyazaki, Japan.
Nokia Siemens Networks, et al., "UE-Originated RLF Report for SON," 3GPP TSG-RAN WG2 Meeting #68bis, R2-100248, Jan. 18-22, 2010, pp. 1-4, Valencia, Spain.
NTT Docomo, Inc., "RLF Detection," 3GPP TSG-RAN WG2 #64, R2-086746, Nov. 10-14, 2008, pp. 1-8, Prague Czech Republic.

(Continued)

*Primary Examiner* — German J Viana Di Prisco
(74) *Attorney, Agent, or Firm* — Coats & Bennett, PLLC

(57) ABSTRACT

Embodiments herein relate to a method in a radio base station for enabling a user equipment to establish a connection in a radio communications network The user equipment is served in a first cell controlled by the radio base station. The radio base station is comprised in the radio communications network. The radio base station detects a failure of a radio link between the user equipment and the radio base station. The radio base station then forwards a user equipment context of the user equipment to a circuitry controlling a second cell when the failure is detected. The user equipment context enables the circuitry controlling the second cell to serve the user equipment and thereby enables the user equipment to establish the connection in the radio communications network.

22 Claims, 7 Drawing Sheets

(56) References Cited

OTHER PUBLICATIONS

3rd Generation Partnership Project, RAN3 (source), "LS on RLF Recovery Information over X2," 3GPP TSG RAN WG2 Meeting #61bis, R2-081426_R3-080553, Shenzhen, CN, Mar. 31-Apr. 4, 2008.

3rd Generation Partnership Project, Ericsson (source), "Detection of RLF," 3GPP TSG-RAN WG2 Meeting #63, R2-084048, Jeju Island, South Korea, Aug. 18-22, 2008.

3rd Generation Partnership Project, Nokia (source), "Report on [65.9]: Email Discussion for Handling of RLC UM Error and Ciphering Issue During CS-HSPA," 3GPP TSG-RAN WG2 Meeting #65bis, R2-092199, Seoul, South Korea, Mar. 23-27, 2009.

3rd Generation Partnership Project, "Technical Specification Group Radio Access Network; Evolved Universal Terrestrial Radio Access (E-UTRA); Physical Layer Procedures (Release 9)," 3GPP TS 36.213 v9.0.1, Sophia Antipolis Valbonne, FR, Dec. 17, 2009.

3rd Generation Partnership Project, CATT (source) "Considerations on Radio Link Failure in CA," 3GPP TSG RAN WG2 Meeting #67bis, R2-095482, Miyazaki, JP, Oct. 12-16, 2009.

Qualcomm Incorporated, "UE context fetch procedure stage 2", 3GPP TSG-RAN WG3 Meeting #67, Feb. 22-26, 2010, pp. 1-4, San Francisco, US R3-100893.

Qualcomm Incorporated, "UE context fetch procedure stage 3", 3GPP TSG-RAN WG3 Meeting #66-bis, Jan. 18-22, 2010, pp. 1-54, Valencia, Spain R3-100894.

3rd Generation Partnership Project, Technical Specification Group Radio Access Network; Evolved Universal Terrestrial Radio Access Network (E-UTRAN); X2 application protocol (X2AP) (Release 9); Sep. 2009, pp. 1-102, 3GPP TS 36.423 V9.0.0.

\* cited by examiner

HANDLING RADIO LINK FAILURE IN A RADIO COMMUNICATIONS NETWORK

RELATED APPLICATION

This application claims priority to U.S. Provisional Application Ser. No. 61/306,757, filed Feb. 22, 2010 and incorporated by reference herein in its entirety.

TECHNICAL HELD

Embodiments herein relate to a radio base station and a method therein. In particular, embodiments herein relate to enable a user equipment to establish a connection in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few. A radio communications network comprises radio base stations providing radio coverage over at least one respective geographical area forming a cell. User equipments are served in the cells by the respective radio base station and are communicating with respective radio base station. The user equipments transmit data over an air interface to the radio base stations in Uplink (UL) transmissions and the radio base stations transmit data to the user equipments in Downlink (DL) transmissions. When a user equipment moves from one cell to another the connection or radio link of the user equipment must be transferred in a so called handover (HO) process. Within for example LTE a reuse of frequencies between cells is used, similar to WCDMA-based systems. However, in LTE soft HO of a user equipment between cells is not a part of the standard specifications and instead hard HO of the user equipment between cells is adopted. Soft handover means that the user equipment is connected to both the cells simultaneously during the handover procedure. Hard handover means that a radio link to a source cell is released and then a radio link to the target cell is established. However, hard handover is a procedure which might experience failures such as Radio Link Failures (RLF).

Typical scenarios where RLFs might occur more often are the so called i) "high-speed train" and ii) "Manhattan" scenarios. A high speed train scenario is when a user equipment is moving fast between cells and a Manhattan scenario is when the user equipment is moving between a high number of cells due to a corner effect. A corner effect means that the user equipment may be served in one cell and when going around a corner a different cell may be in line of sight and the served cell may not have radio coverage around the corner leading to a very abrupt cell change. In order combat RLFs, within present versions of LTE, such as Release 8 and beyond, a mechanism which permits the user equipment to recover from RLF has been defined.

The mechanism is termed within 3GPP "RLF recovery" and comprises a process wherein a radio link failure occurs during a handover at a time instance and the procedure to recover involves acquiring synchronization with the cellular system again. The synchronization requires a certain time to be performed. After that, the user equipment selects a best cell in terms of measuring signal strength such as Reference Signal Received Power (RSRP) or Reference Signal Received Power Quality (RSRQ) which are processes to indicate signal strength of reference signals. This also requires some time interval to be performed. The user equipment then performs a random access procedure also requiring some time. The random access procedure is performed in order to establish a connection. Finally, the user equipment performs a Radio Resource Control (RRC) Connection Reestablishment Request and gets a RRC Connection Reestablishment Complete response indicating connection reestablished.

A slow RLF recovery implies a long interruption time. The duration of the whole radio link failure recovery is dictated by a timer. In case the user equipment does not receive an acknowledgement (ACK) such as an RRC Connection Reconfiguration Request ACK message from the network within a time duration defined by the timer, then the RLF recovery procedure is determined to have failed and the user equipment goes from an active mode back to an idle mode. In this case, the RRC connection is lost and the user equipment needs to establish a new RRC connection. Simulations have shown that in these challenging mobility scenarios, the whole procedure lasts 500-600 ms for 90% of the cases.

The time duration for performing the RRC connection reestablishment may increase the interruption time. Prior art solutions describe scenarios where the cell that receives the RRC Connection Reestablishment Request message contacts the last serving cell of the user equipment in discussion here. This is a feasible option since the RRC Connection Reestablishment Request message includes the temporary cell id of its last serving cell. This range of solutions is termed within 3GPP as "UE context-fetching" solutions. Prior art solutions are solutions for maintaining the RRC connection, since the RLF recovery procedure is successful within the time specified by the timer ruling this procedure. However, these prior art solutions imply that the interruption time remains at a high level; as the cell where the UE has landed during RLF recovery has to communicate with the last serving cell of the UE and fetch its context. This procedure of fetching the user equipment context involves communication via X2, which requires some time. For non-delay critical services, this might generate problems in the Transmission Control Protocol (TCP) execution and for delay-critical services, this interruption time is perceived by the user equipment and may be perceived as annoying by a user of the user equipment.

SUMMARY

An object of embodiments herein is to improve the performance of a user equipment within a radio communications network.

According to an aspect of embodiments herein the object is achieved by a method in a radio base station for enabling a user equipment to establish a connection in a radio communications network. The user equipment is served in a first cell controlled by the radio base station, and the radio base station is comprised in the radio communications network. The radio base station detects a failure of a radio link between the user equipment and the radio base station. The radio base station further forwards a user equipment context of the user equipment to a circuitry controlling a second cell when the failure is detected. The user equipment context enables the circuitry controlling the second cell to serve the user equipment. The user equipment is thereby enabled to establish the connection in the radio communications network. Thus, the interruption time is minimized as the circuitry comprises the user equipment context and the performance of the user equipment is improved.

According to another aspect of embodiments herein the object is achieved by providing a radio base station for enabling a user equipment to establish a connection in a radio communications network. The user equipment is served in a first cell controlled by the radio base station and the radio base station is comprised in the radio communications network. The radio base station comprises a detecting circuit configured to detect a failure of a radio link between the user equipment and the radio base station. The radio base station further comprises a forwarding circuit configured to forward a user equipment context of the user equipment to a circuitry controlling a second cell when the failure has been detected. The user equipment context enables the circuitry controlling the second cell to serve the user equipment. The user equipment is thereby enabled to establish the connection in the radio communications network.

Thus, embodiments herein imply a faster RLF recovery reducing interruption times to low values.

BRIEF DESCRIPTION OF THE DRAWINGS

Embodiments will now be described in more detail in relation to the enclosed drawings, in which.

DETAILED DESCRIPTION

Figure 1:
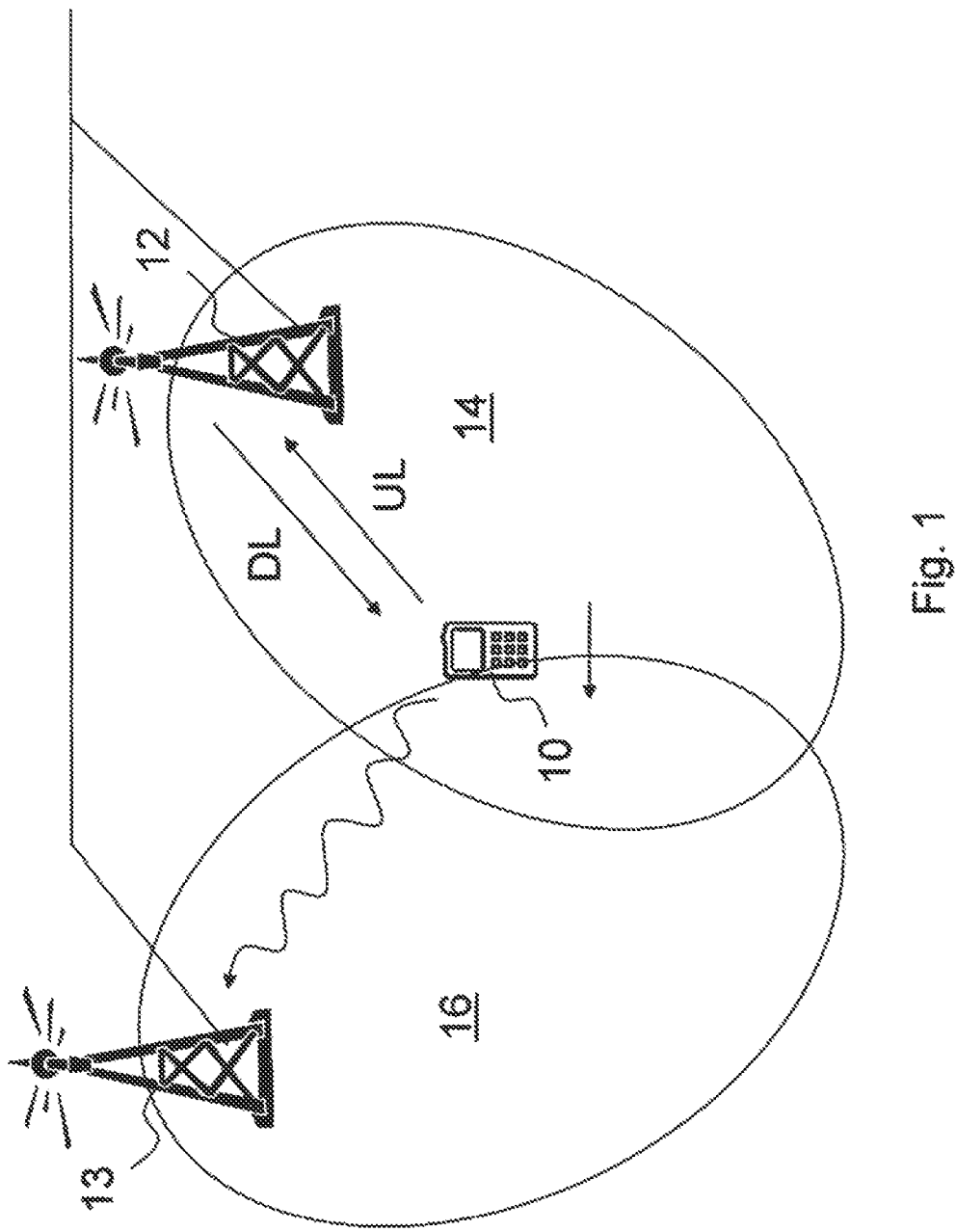
FIG. 1 is a block diagram depicting a radio communications network.

FIG. 1 is a block diagram depicting a radio communications network such as Long Term Evolution (LTE), LTE-Advanced, 3rd Generation Partnership Project (3GPP) Wideband Code Division Multiple Access (WCDMA) system, Time Division Synchronous Code Division Multiple Access (TD-SCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few.

A user equipment 10 is comprised in the radio communications network. The user equipment 10 is served in a first cell 14 controlled by a first radio base station 12. The user equipment 10 is moving towards a second cell 16 controlled by a second radio base station 13. The radio base stations 12, 13 provide radio coverage within a geographical area forming respective cell 14, 16. The first user equipment 10 in the first cell 14 is communicating with the first radio base station 12 in an Uplink transmission when data is transmitted to the first radio base station 12 and in a Downlink transmission when data is sent to the first user equipment 10 from the first radio base station 12.

The user equipment 10 may e.g. be represented by a wireless communication terminal, a mobile cellular phone, a Personal Digital Assistant (PDA), a legacy user equipment, a wireless platform, a laptop, a computer or any other kind of device capable to communicate wirelessly with the radio base stations 12, 13.

The respective radio base station 12, 13 may also be referred to as e.g. a NodeB, an evolved Node B (eNB, eNode B), a base transceiver station, Access Point Base Station, base station router, or any other network unit capable to communicate with a user equipment 10 within the cells 14, 16 served by the respective radio base station 12, 13, depending e.g. of the radio access technology and terminology used.

As stated above the user equipment 10 is moving towards the second cell 16 and it may happen that a Radio link Failure (RLF) occurs during a handover of the user equipment 10 from the first cell 14 to the second cell 16. Radio link failures may also occur when entering a radio coverage hole or similar situations losing a radio link. The radio link is herein referred to as a radio link but may also be referred to as a connection.

According to embodiments herein the first radio base station 12 detects that a radio link failure has occurred. This may be detected by monitoring/analyzing traffic within the first cell 14 or receiving an indication from the user equipment 10.

When the first radio base station 12 has detected that the radio link failure has occurred, the first radio base station 12 forwards a user equipment context of the user equipment 10 to a circuitry in the second radio base station 13. The circuitry controls the second cell 16 and assists in a serving the second cell 16. The circuitry may comprise hardware and/or software within the radio base station 13 configured to provide radio coverage over the second cell 16. It should here be noted that the first radio base station 12 may serve the second cell 16 and comprise the circuitry that controls the second cell 16.

The User Equipment (UE) context may comprise user subscription information such as radio bearers established, Quality of Service (QoS) and transport parameters, security context, handover restriction and/or similar user equipment data, and enables the circuitry controlling the second cell 16 to serve the user equipment 10. The user equipment 10 is thereby enabled to establish a connection in the radio communications network by the presence of the user equipment context in the circuitry.

Embodiments herein relate to an algorithm which helps the first radio base station 12 to detect RLF at the user equipment 10. Upon detection of RLF, the first radio base station 12 forwards the user equipment context to, for example, circuitries controlling a number N of neighbor cells. In case the first radio base station 12 has received a measurement report by the user equipment 10 for which RLF is detected, the first radio base station 12 may forward this user equipment context to circuitries controlling the target cell e.g. the second cell 16 indicated by the measurement report plus N−1 cells. Otherwise, these neighbor cells may be the ones indicated by previous mobility measurements, or the ones having signaled high other cell interference from the first radio base station 12; i.e. the cells to which the user equipment context is forwarded do not need to be all of the neighbor cells. The time to receive a response for the RRC connection is reduced and thus also the interruption time perceived by the user equipment. The user of the user equipment then perceives the performance of the user equipment as improved.

According to embodiments herein the interruption time may be reduced by making the user equipment context available in the cell where the user equipment 10 attempts to recover from RLF. The embodiments herein relate to a method and the radio base station 12 in the radio communications network such as a wireless cellular telecommunication system. In particular embodiments herein relate to handover (HO) and radio link failure (RLF) recovery for the first user equipment 10, e.g. between base stations, sectors, cells, carriers, or Radio Access Technologies (RAT). Embodiments herein are exemplified in the context of 3GPP LTE or LTE Advanced but not limited to these systems. The proposed method and radio base station 12 may be applied to any kind of cellular system employing similar procedures of handover, RLF & RLF recovery as the ones of 3GPP LTE & LTE Advanced.

Figure 2:
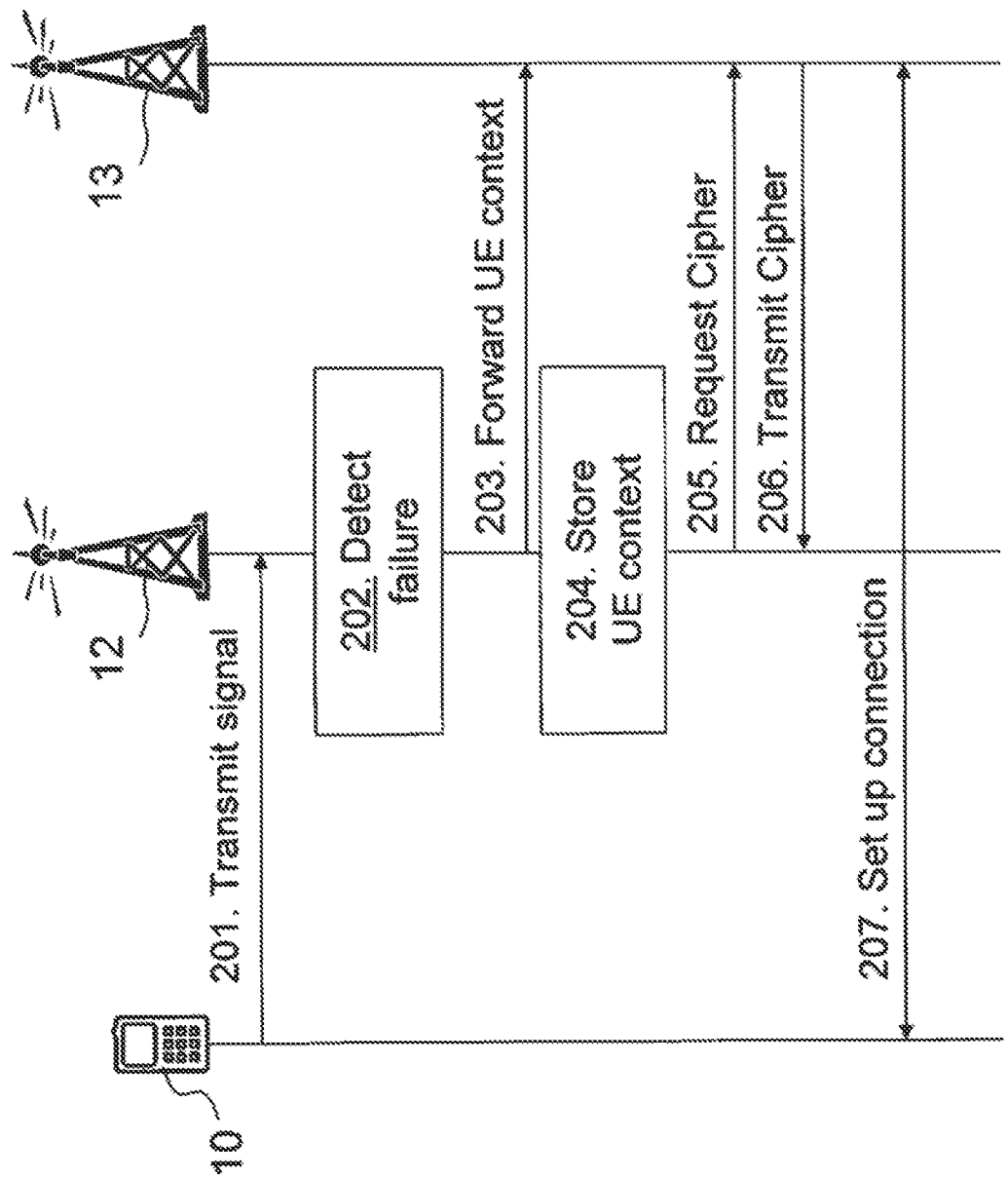
FIG. 2 is a combined schematic flowchart and signalling scheme in a radio communications network.

FIG. 2 is a combined flowchart and signaling scheme in a radio communications network. The scheme enables the user equipment 10 to establish or re-establish the connection in the radio communications network after a radio link failure in an efficient and quick manner. The user equipment 10 is served in the first cell 14, which is controlled by the first radio base station 12. The first radio base station 12 is comprised in the radio communications network.

Step 201. The user equipment 10 is connected to the first radio base station 12 and transmits a signal to the first radio base station 12.

Step 202. The first radio base station 12 then detects that a radio link failure has occurred. For example, the radio base station 12 may detect the radio link failure through monitoring and analysing traffic within the first cell 14 or from receiving a radio link failure indication from the user equipment 10.

Step 203. The first radio base station 12 then forwards a user equipment context of the user equipment 10 to at least one circuitry controlling at least one cell, e.g. the cell with the strongest reported signal. Thus, the user equipment context is present at the at least one cell when the user equipment 10 tries to establish a connection to a circuitry controlling the at least one cell.

An additional scenario that may be considered is that when the user equipment 10 recovers in a given cell, e.g. the second cell 16, after RLF, receives its user equipment context in the second cell 16, but then the user equipment 10 returns back to its previous serving cell, e.g. first cell 14, the one before the RLF detection. The user equipment 10 may also, while returning back to its previous serving cell, the first cell 14, detect another RLF. This may be the case where a first RLF is detected when the user equipment 10 is about to do a ping-pong HO, then a second RLF is detected when the user equipment 10 is trying to return back to the first cell 14 in an effort to correct its previous decision. A ping pang handover means that handover between cells are repeated back and forth.

In this case the user equipment 10 ends up in the first cell 14, where the user equipment context is not available anymore, as the user equipment context has been forwarded to the circuit controlling the second cell 16. Consequently, the first radio base station 12 needs to fetch the user equipment context again. Or, even worse, the user equipment 10 detects a RLF when transmitting a handover confirm message to a new service level. In this case the user equipment context is not available in the second cell 16 where the user equipment 10 detects the RLF, as the second radio base station 13 has not fetched the user equipment context yet. In case the user equipment 10 tries to recover from RLF in another third cell or in the first cell 14, those radio base stations controlling the cells cannot fetch the user equipment context since the last serving cell, the second cell 16, is not in possession of the user equipment context. These cases may mainly occur when the user equipment 10 declares RLF during a ping-pang HO and refer to a non-successful execution of the ping-pang HO. In order to combat those cases and the case when the ping-pong HO is triggered and is successfully executed, the following is provided.

Step 204. In some embodiments wherein the user equipment context is forwarded to the circuitry controlling the second cell 16, the target cell, or to circuitries controlling N neighbour cells, either during successful HO execution, or during user equipment context forwarding upon detection of RLF at the first radio base station 12, the user equipment context of the user equipment 10 may be stored in the radio base station 12 for a given time period which is defined by a store timer Timer_3.

If it is estimated that this storing of the user equipment context in the first radio base station 12 may lead to unnecessary loading of the first radio base station 12, then the first radio base station 12 may store this user equipment context only when aggressive HO triggers are used. The reason is that embodiments herein intend to provide a solution for the case where ping-pong HOs occur and those ping-pong HOs happen typically when aggressive HO triggers are used. Hence, the storing of the user equipment context may occur only when conditions (EQ1) and (EQ2) are satisfied, which are typically indications of aggressive HO triggers:

$$HO\_hysteresis < Threshold\_1 \quad (EQ1)$$

$$TimeToTrigger < Threshold\_2 \quad (EQ2)$$

where

HO_hysterisis defines number of back and forth attempts to perform handover between cells, and TimeToTrigger defines length of time period to trigger a handover.

The Threshold_1 may be set such that the user equipment context is stored only when the HO hysteresis is not sufficiently large so as to protect from ping-pong handovers. Typical values for Threshold_1 are 3-4 dBs. The Threshold_2 may be set such that the user equipment context is stored only when the time to trigger is not large enough so as to guarantee that no ping-pong handovers occur. Typical Threshold_2 values are 640-1280 ms.

Step 205. In order to be able to make use of the user equipment context at a later stage, the previous serving radio base station, e.g. the first radio base station 12, may have to request for ciphering keys used in the second cell 16 to which the user equipment 10 is now connected. Therefore, the first radio base station 12 may request this information from cells to which the user equipment context is forwarded to, and cells which the first radio base station 12 may detect that the user equipment 10 is connected to. In the illustrated example, the first radio base station 12 requests security information, such as the ciphering keys, from the second radio base station 12 controlling the second cell 16.

Step 206. In some embodiments, the second radio base station 13 may then transmit the ciphering keys to the first radio base station 12 so that the first radio base station 12 is enabled to use the user equipment context.

Step 207. The user equipment may set up the connection to the second radio base station with the aid of the user equipment context.

Figure 3:
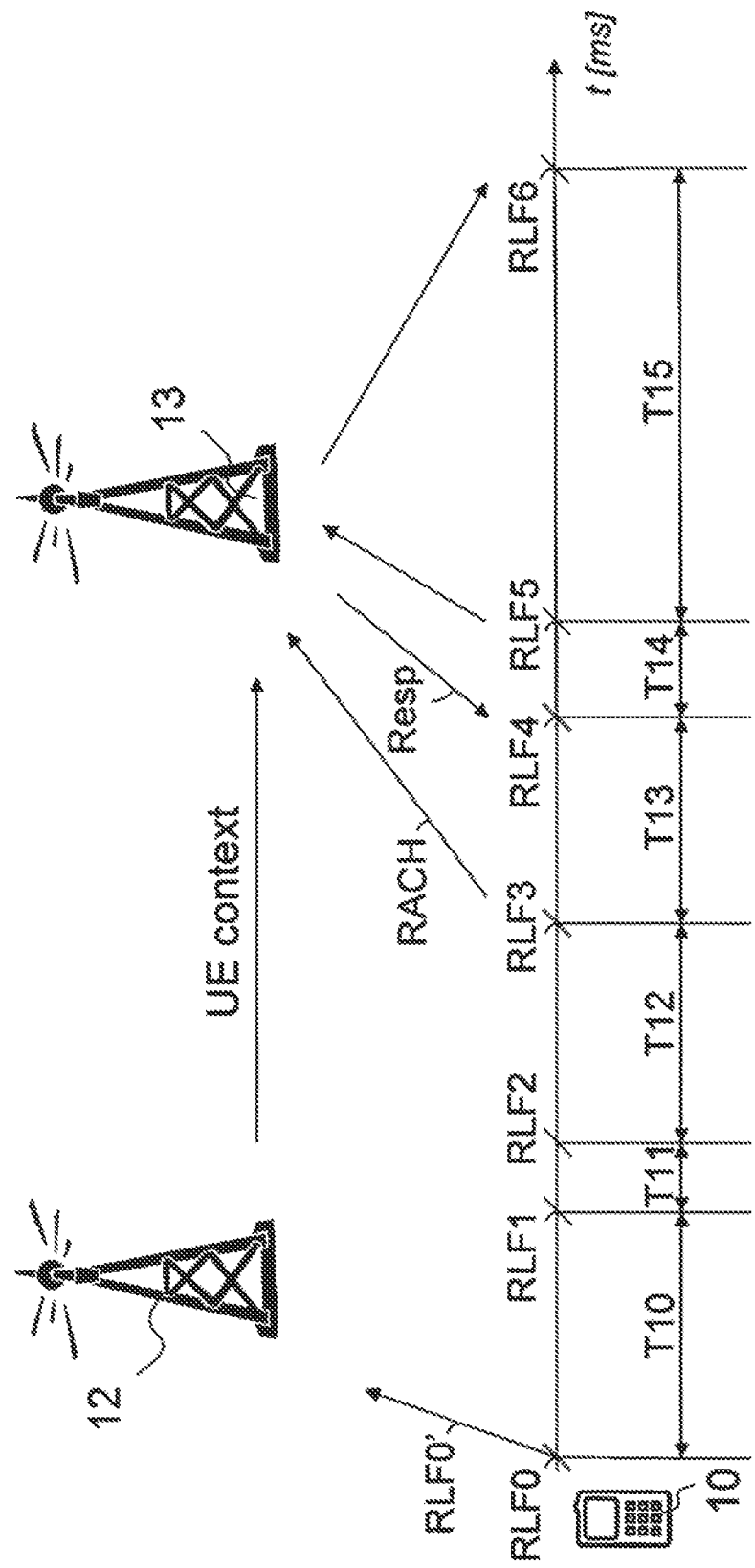
FIG. 3 is a schematic overview of a process during an establishment of a connection in a radio communications network.

FIG. 3 is a block diagram of an embodiment of a process during a radio link failure in a radio communications network. A radio link failure may occur in different processes such as before, during or after a handover between different cells, an occurrence of coverage hole in the radio communication network or similar. A coverage hole is an area within the radio coverage of the radio communications network in which a signal level is below a design threshold. The coverage hole is usually caused by physical obstructions such as buildings, foliage, hills, tunnels and indoor parking garages.

Step RLF0. The user equipment 10 may detect that it is not synchronized to the radio communications network indicating a radio link failure. For example, the user equipment 10 receives a number of consecutive out of synchronization (sync) indications and does not receive an in sync indication during a time interval. An out of sync indication may be when a radio link quality, such as Signal to Interference plus Noise Ratio (SINR) or similar, drops below a low threshold value for synchronization and an in-sync indication may be when the radio link quality is above a high threshold value for synchronization. The low threshold value may be lower than or equal to the high threshold value.

In some alternative embodiments, the user equipment 10 may detect an out of sync indication over a physical Downlink control channel (PDCCH) from the radio base station 12, similarly to the out of sync indications discussed above. The user equipment 10 may have stored some timing information and then the user equipment 10 may attempt a random access procedure on a Random Access Channel (RACH), as indicated by the arrow RLF0'. Thereby the first radio base station 12 may be informed that the random access request is coming from a user equipment that is "about to die" or get disconnected. That is, the first radio base station 12 may detect that a radio link failure has probably occurred when receiving the random access request, which is probably severely non-synchronized to a radio network clock. Severely here means that random access request is out of sync with a time difference larger than a time advance value the first cell 14 supports. In these embodiments the first radio base station 12 may poll the user equipment 10 about to get disconnected by transmitting an Uplink scheduling grant to the user equipment 10. In case no Uplink transmission is received at the first radio base station 12, the first radio base station 12 already here forwards the user equipment context to one or more circuitries controlling neighboring cell or cells, such as the second cell 16.

In some embodiments herein the first radio base station 12 detects that the radio link may fail by monitoring/analyzing traffic of the radio link. Thus, the first radio base station 12 detects the radio link failure either from monitoring traffic over the radio link of the user equipment 10, or indicated from the user equipment 10. After the radio link failure is detected the first radio base station 12 forwards the user equipment context to one or more circuitries controlling one or more cells.

Step RLF 1. In some embodiments the user equipment 10 after detecting radio link failure synchronizes to the radio communications network, which synchronization requires a time to perform the process. A synchronization time interval T10 needed to synchronize to the system is defined as a time between the steps RLF1-RLF0.

Step RLF2. The user equipment 10 may select a best cell in terms measuring signal strength such as Reference Signal Received Power (RSRP) or Reference Signal Received Quality (RSRQ). This may be performed by measuring on a reference signal and identifying the best cell in terms of RSRP or RSRQ respectively. A second time interval T11 needed is defined as a selecting time indicating time between steps RLF2 to the RLF1.

Step RLF3. The user equipment 10 may then initiate a random access procedure to the selected best cell at time instance RLF3 after listening to a Physical Broadcast Channel (P-BCH) and a System Information Broadcast (SIB) channel of the selected best cell. A third time interval T12 needed so as to listen to P-BCH and SIBs is defined as the time between the steps RLF3-RLF2.

Step RLF4. The random access procedure is completed and successful at time instance RLF4. A fourth time interval T13 interval needed to complete the random access procedure is defined as random access time indicating time between steps RLF4-RLF3.

Step RLF5. The user equipment 10 may transmit a Radio Resource Control (RRC) Connection Reestablishment Request message at time instance RLF5. A fifth time interval T14 needed is defined as the time required for transmitting the RRC connection request message i.e. the time between steps RLF5-RLF4.

Step RLF6. The user equipment 10 may then receive an RRC Connection Reestablishment Complete response from the second radio base station 13 for this request at time instance RLF6. A sixth time interval T15 is needed between the steps RLF6-RLF5.

According to embodiments herein the sixth time interval T15 is minimized by introducing the function in the first radio base station 12 as described above. The presence of the user equipment context at the circuitry controlling the second cell 16 reduces the time between the instant the user equipment 10 transmits the RRC Connection Reestablishment Request message and the instant the user equipment 10 gets the response by the network, in the form of a RRC Connection Reestablishment Complete. This sixth time interval T15 depends on whether the user equipment context is available in the cell in which the user equipment 10 has landed after RLF. This delay ranges from tens of milliseconds up to more than 200 of milliseconds today, accounting thus for 10-50% of the overall RLF recovery duration. By forwarding the user equipment context, the user equipment context is available in the first or second cell 14, 16 where the user equipment 10 attempts to recover from RLF and the interruption time is minimized.

Figure 4:
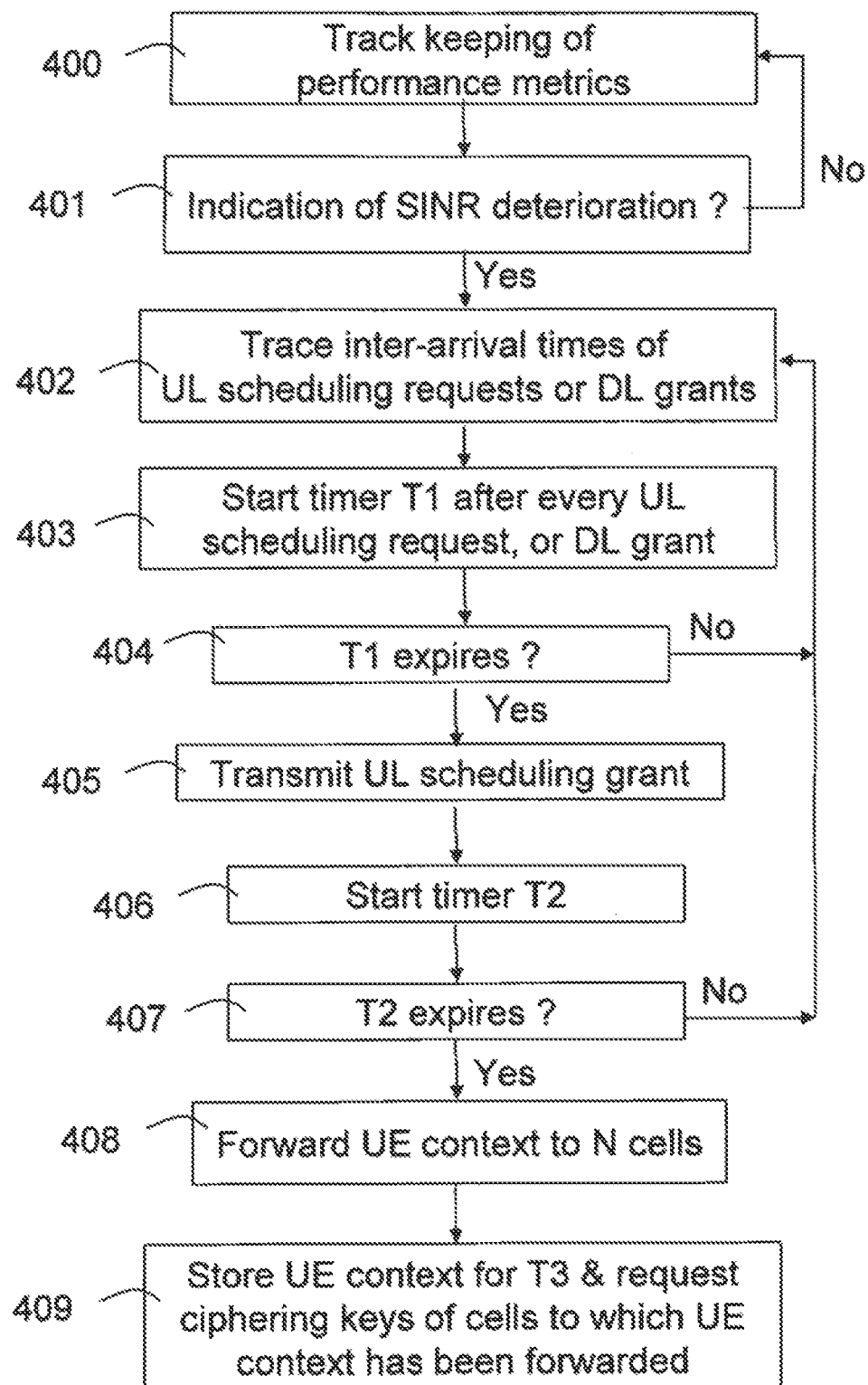
FIG. 4 is a schematic flowchart of embodiments disclosed herein.

FIG. 4 is a schematic flowchart of an embodiment in the first radio base station 12 for enabling a user equipment to establish a connection in the radio communications network.

Step 400. In some embodiments herein the first radio base station 12 may keep track of a quality of the radio links the first radio base station 12 maintains with user equipments within the first cell 14, e.g. the user equipment 10. In this respect the first radio base station 12 may keep track of performance metrics, such as the Downlink (DL) Channel Quality Indicator (CQI) reports received from the user equipments, or of Uplink (UL) sounding reference signals (SRS), or of number of Hybrid Automatic Request (HARQ) Non-Acknowledge (NACKs) received from the user equipment 10. Thus, the first radio base station 12 may track a channel quality of the radio link.

Step 401. The first radio base station 12 may further determine whether the radio link is deteriorating. For example, in case the above mentioned performance metrics indicate a deterioration of the radio link with the user equipment 10, for example in case either or all $$avg\_DL\_SINR < Threshold\_3 \quad (EQ3)$$

$$avg\_UL\_SINR < Threshold\_4 \quad (EQ4)$$

$$\#consecutive\_HARQ\_NACKs > Threshold\_5 \quad (EQ5)$$

are detected for the radio link to the user equipment 10, then the first radio base station 12 may start monitoring the traffic activity for the user equipment 10.

avg_DL_SINR defines an average of the Signal to Interference plus Noise Ratio (SINR) in the DL,
avg_UL_SINR defines an average of the SINR in the UL, and
consecutive_HARQ_NACKs defines number of consecutive received HARQ NACKs. The Threshold_3, Threshold_4, and Threshold_5 may be preset, adjusted dynamically or updated continuously.

This implies that some averaging of a number N of CQI or UL SRS values may be done at the serving first radio base station 12. Considering that this measurement may reflect also the dynamic behavior of the radio link, the reasonable approach is that N is not a high number.

Thus, the first radio base station 12 may determine whether the channel quality is below one or more lower threshold value and/or exceeds one or more upper threshold value. If the radio link is not determined to be deteriorated the process may go back to step 400.

Step 402. The first radio base station 12 may monitor traffic activity over the radio link when the tracked channel quality exceeds the upper threshold value and/or goes below the lower threshold value. For example, when at least one out of equations (EQ3)-(EQ5) or a combination of them has been satisfied, the first radio base station 12 may start monitoring the traffic activity for the user equipment 10. For example, it is traced an inter-arrival time, $t_{inter}$, of received scheduling requests and sent DL or UL scheduling grants to the user equipment 10. Considering that the user equipment 10 is in active mode, there is frequent activity in a data plane for the user equipment 10 and after tens of milliseconds, the first radio base station 12 has a fair estimation of an average inter-arrival time of scheduling requests or grants, $avg\_t_{inter}$ being an appropriate indication of the traffic activity for the user equipment 10.

The tracing of activity at a physical layer may be performed only when there is also higher layer protocol layer activity; for both Downlink and Uplink traffic. The first radio base station 12 may keep track of higher layer protocol activity. This may be performed by observing data buffers at the network at the Medium Access Control (MAC), Radio link Control (RLC), Packet Data Convergence Protocol (PDCP) and Transmission Control Protocol (TCP) layers. Data buffers storing transmitter's information are used so as to identify activity in Downlink and the buffers storing receiver's information indicate the activity in Uplink.

Step 403. For the user equipment 10 for which the traffic activity is monitored, upon transmission of a scheduling grant, UL or DL, or upon reception of a scheduling request, the first radio base station 12 may start a first timer, denoted as timer_1. A first time threshold T1 of this first timer may be equal to the average inter-arrival time between scheduling requests or grants plus an additional offset, denoted as offset_1:

$$\text{timer}\_1 = avg\_t_{inter} + \text{offset}\_1 \quad (EQ6)$$

The value of offset_1 may be set to a value so that timer_1 has a first time threshold T1 equivalent to the value of a timer detecting RLF in the user equipment 10 specified in the standard document TS 36.331, e.g. timer T310. The first time threshold T1 may be updated when needed.

Step 404. The first radio base station 12 may determine whether the first time threshold T1 has expired. If the first time threshold T1 of timer_1 has not expired the radio link is considered to be functional and the process may go back to step 402.

Step 405. Upon expiration of timer_1 the first radio base station 12 may transmit an UL scheduling grant message to the user equipment 10, asking to get, for example, a report on the user equipment buffer size.

Step 406. The first radio base station 12 may then start a second timer, denoted as timer_2 that has a second time value T2.

Step 407. The first radio base station 12 may then determine whether the second timer timer_2 expires before receiving an UL transmission from the user equipment 10.

If the second time value T2 has not expired when receiving the UL transmission the radio link is considered to be functional and the process may go back to step 402.

Step 408. In case the first radio base station 12 does not receive the UL transmission from the user equipment 10, then the user equipment context of this user equipment is forwarded to circuitry or circuitries controlling N neighbour cells, where N may be one or more.

If the user equipment 10 has reported measurements done on reference signals, then very likely in these measurements a best cell in terms of RSRP, or a so-called target cell might have been indicated, such as the second cell 16. The first radio base station 10 may then forward the user equipment context to the circuit controlling the second cell 16 and circuitries controlling N−1 other cells. These other cells may be the ones indicated by a previous mobility history in the first cell 14. In for example LTE Release 8 the first radio base station 12 may keep track of cells where user equipments, such as the user equipment 10, are handed over. Hence, information on most probable target cells is available.

Another type of information which may be used so as to define the cells to which the user equipment context is to be forwarded, is X2 messages on Overload Indication (OI) received by neighbor cells. X2 is a communication interface between radio base stations. Such information is a good indication of some user equipments in the first cell 14 being close to another neighbour cell and creating interference to those neighbour cells.

For instance, in a Manhattan scenario the user equipment 10 almost always ends up in the target cell and the same applies, approximately 80% of the time, in a high speed train scenario. Hence, in some embodiments forwarding to the circuitries controlling the target cell and 1 more cell ray be sufficient. It may happen that all of the cells to which the user equipment context is forwarded are controlled by the same radio base station. In this case, one signalling message via X2 is sufficient.

Step 409. As stated above the first radio base station 12 may store the user equipment context for a third time value T3 seconds defined by the store timer Timer_3 and request the circuitry or circuitries controlling one or more cells to which the user equipment context has been forwarded to send their ciphering keys.

Figure 5:
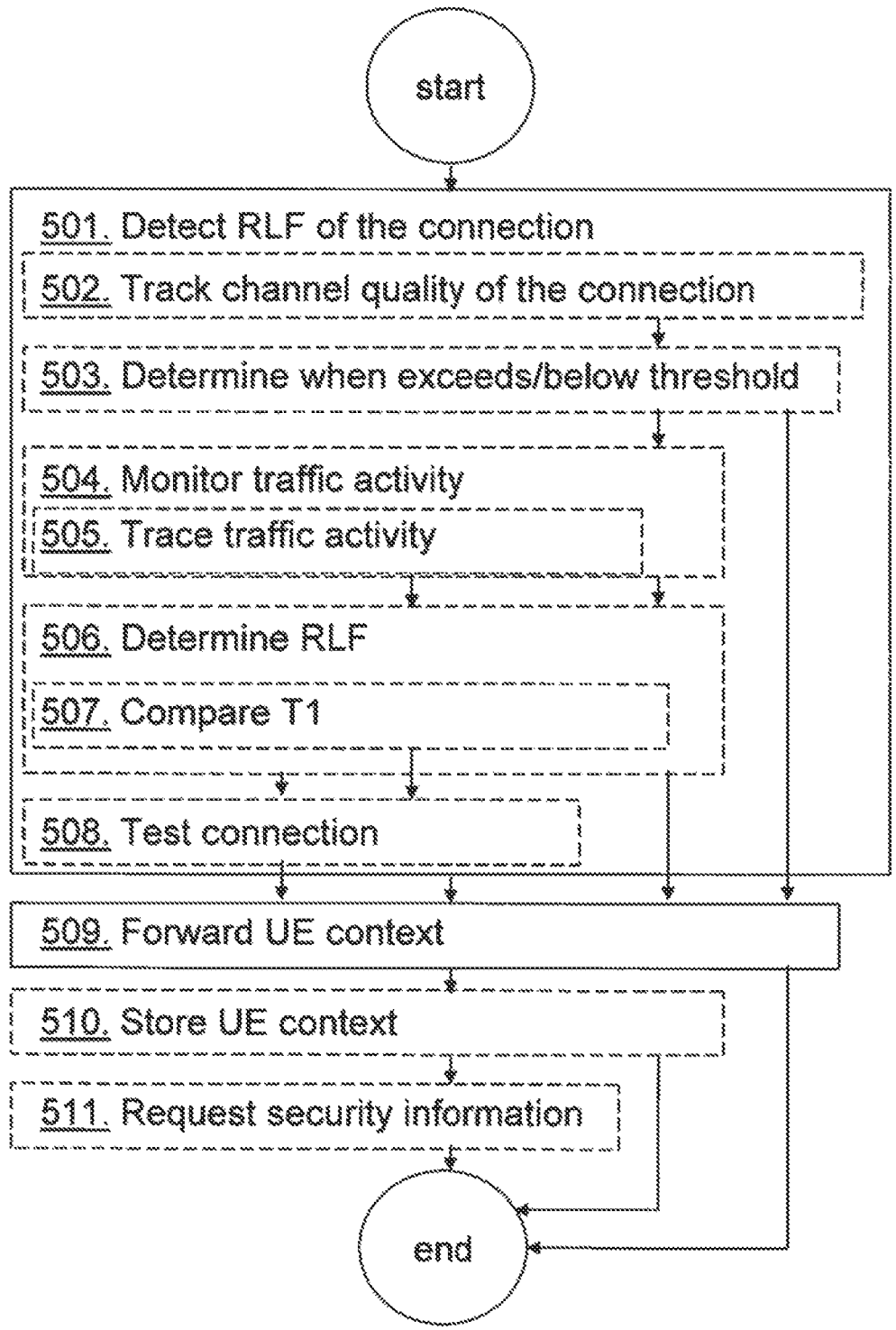
FIG. 5 is a schematic flowchart of a method in a radio communications network.

The method steps in the radio base station, referred to as the first radio base station 12 in the figures, for enabling the user equipment 10 to establish a connection in the radio communications network according to some general embodiments will now be described with reference to a flowchart depicted in FIG. 5. The steps do not have to be taken in the order stated below, but may be taken in any suitable order. The user equipment 10 is served in the first cell 14 controlled by the radio base station 12 and the radio base station 12 is comprised in the radio communications network.

Step 501. The radio base station 12 detects a failure of a radio link between the user equipment 10 and the radio base station 12. It should be understood that the detection of the failure may comprise any or any combination of the steps 502-508.

Step 502. In some embodiments, as indicated by the dashed line, the radio base station 12 may track a channel quality of the radio link.

Step 503. In some embodiments, as indicated by the dashed line, where the radio base station 12 tracks the channel quality, the radio base station 12 determines the failure to be detected when the tracked channel quality exceeds an upper threshold value and/or goes below a lower threshold value. In some other embodiments, the radio base station 12 determines that the tracked channel quality exceeds the upper threshold value and/or goes below the lower threshold value and moves to the step 504.

Step 504. In some embodiments, as indicated by the dashed line, the radio base station 12 monitors a traffic activity over the radio link when the tracked channel quality exceeds the upper threshold value and/or goes below the lower threshold value.

Step 505. In some embodiments, as indicated by the dashed line, the radio base station 12 may monitor the traffic activity by tracing a time between receiving or transmitting a first scheduling message and receiving or transmitting a second scheduling message.

Step 506. In some embodiments, as indicated by the dashed line, the radio base station 12 may determine that the failure of the radio link is detected when traffic activity falls below an activity threshold, and there is data buffered or protocol activity for the user equipment 10 in the radio base station 12.

Step 507. In some embodiments, as indicated by the dashed line, the radio base station 12 may determine that the failure of the radio link is detected by comparing the traced time with a first time threshold, also referred to as T1. In some embodiments the first time threshold T1 comprises an average time between previous consecutive received scheduling messages or previous consecutive transmitted scheduling messages, and a time offset.

Step 508. In some embodiments, as indicated by the dashed line, the radio base station 2 may detect the failure by testing the radio link. The testing may comprise transmitting a message to the user equipment 10 and comparing whether a response is received from the user equipment 10 within a second time value T2. If the second time value T2 expires the failure is detected. The message may comprise a UL allocation grant or similar.

In some embodiments the detection of failure may be determined by receiving an indication from the user equipment 10 indicating a radio link failure of the radio link detected at the user equipment 10. Thus, in some embodiments this detection step may alternatively or additionally be triggered by a specific CQI or a Random Access Channel (RACED request received from the user equipment 10.

Step 509. The radio base station 12 forwards a user equipment context of the user equipment 10 to a circuitry controlling a second cell 16 when the failure is detected. The user equipment context enables the circuitry controlling the second cell 16 to serve the user equipment 10. As the user equipment 10 may be served by the circuitry the user equipment 10 is enabled to establish the connection in the radio communications network.

In some embodiment the radio base station 12 may forward the user equipment context to one or more circuitries controlling a number of cells. The cells to select may be based on mobility history of other user equipments served in the first cell 14 or interference indications from user equipments within the first cell 14 or other cells.

In some embodiments the user equipment context may be forwarded when the traced time is beyond the first time threshold T1.

In some embodiments the second cell 16 may be a cell with a strongest signal strength of all cells reported from the user equipment 10. The second cell 16 may be served by the radio base station 12 or another radio base station, such as the second radio base station 13.

Step 510. In some embodiments, as indicated by the dashed line, the radio base station 12 stores the user equipment context for a set time T3 after forwarding the user equipment context. This may in some embodiments only be performed for user equipments with handover settings comprising setting values below one or more settings threshold values.

Step 511. The radio base station 12 may in some embodiments, as indicated by the dashed line, send a request to the circuitry controlling the second cell 16 requesting security information related to the user equipment 10. Such security information may be decoding parameters, cyphering keys or similar.

Figure 6:
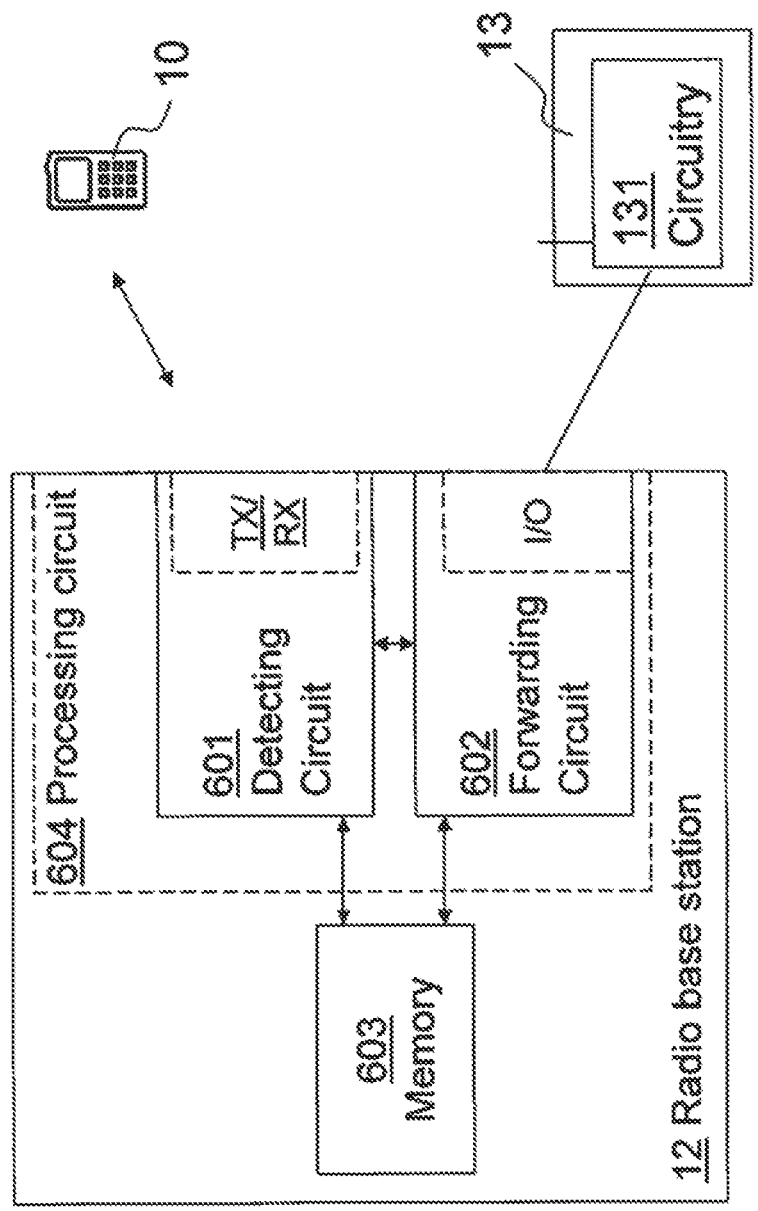
FIG. 6 is a block diagram depicting a radio base station.

In order to perform the method, a radio base station for enabling the user equipment 10 to establish a connection in a radio communications network is provided. FIG. 6 is a block diagram depicting the radio base station 12. As stated above, the user equipment 10 is served in the first cell 14 controlled by the radio base station 12.

The radio base station 12 is comprised in the radio communications network and comprises a detecting circuit 601 configured to detect a failure of a radio link between the user equipment 10 and the radio base station 12. The detecting circuit 601 may comprise a transceiver TX/RX as indicated by the dashed line.

In some embodiments the detecting circuit 601 may be further configured to track a channel quality of the radio link, and to determine that the failure is detected when the tracked channel quality exceeds an upper threshold value and/or goes below a lower threshold value.

In some embodiments the detecting circuit 601 may be further configured to track a channel quality of the radio link and to determine whether the channel quality exceeds an upper threshold value and/or goes below a lower threshold value. The detecting circuit 601 may additionally be configured to monitor a traffic activity over the radio link when the tracked channel quality exceeds the upper threshold value and/or goes below the lower threshold value. Additionally in these embodiments the detecting circuit 601 may be configured to determine that the failure of the radio link is detected when traffic activity falls below an activity threshold, and there is data buffered or protocol activity for the user equipment 10 in the radio base station 12.

The detecting circuit 601 may in some embodiments be further configured to test the radio link by transmitting a message to the user equipment 10 and to compare whether a response is received from the user equipment 10 within a second time value T2. If the second time value expires the detecting circuit 601 determines that a failure is detected. The message may be an Uplink scheduling grant, a poll or similar.

In some embodiments, the detecting circuit 601 may be configured to receive an indication for the user equipment 10 indicating a radio link failure of the radio link. The radio base station 12 may then test the radio link and/or monitor activity or similar, to detect the failure.

Furthermore, the radio base station 12 comprises a forwarding circuit 602 configured to forward a user equipment context of the user equipment 10 to a circuitry 131 controlling a second cell 16 when the failure has been detected. The user equipment context enables the circuitry 131 controlling the second cell 16 to serve the user equipment. The circuitry 131 may comprise hardware, such as an antenna and a processor, and/or software within a radio base station 13 configured to provide radio coverage over the second cell 16. It should here be noted that the first radio base station 12 may serve the second cell 16 and comprise the circuitry 131 that controls the second cell 16.

Thereby, the user equipment 10 is enabled to establish the connection in the radio communications network The forwarding circuit 602 may comprise a transmitter as indicated by the dashed line. The circuitry controlling the second cell 16 may be comprised in the radio base station or a different radio base station 13.

The forwarding circuit 602 may further be configured to select the second cell 16 as a cell with a strongest signal strength of all cells reported from the user equipment 10.

In some embodiments the forwarding circuit 602 may be configured to forward to one or more circuitries controlling a number of cells. The selection of cells may be based on mobility history of other user equipments served in the first cell 14 or interference indications from user equipments within the first cell 14 or other cells.

The forwarding circuit 602 may further be configured to send a request to the circuitry controlling the second cell 16 requesting security information related to the user equipment 10, such as ciphering keys or similar enabling the radio base station 12 to use the user equipment context.

In some embodiments the detecting circuit 601 may be configured to monitor the traffic activity by tracing a time between receiving or transmitting a first scheduling message and receiving or transmitting a second scheduling message. Furthermore, in some embodiments the detecting circuit 601 may be configured to determine that the failure of the radio link is detected by comparing the traced time with a first time threshold T1. The forwarding circuit 602 may then in these embodiments be configured to forward the user equipment context when the traced time is beyond the first time threshold T1. The first time threshold T1 may comprise an average time between previous consecutive received scheduling messages or previous consecutive transmitted scheduling messages, and a time offset.

The radio base station 12 may in some embodiments comprise a memory 603 and the radio base station may be configured to store the user equipment context in the memory 603 for a set time T3 after forwarding the user equipment context. In some embodiments, the radio base station 12 may be configured to store the user equipment context only for user equipments with handover settings comprising setting values below one or more settings threshold values.

The memory 603 may comprise one or more memory units and may be used to store for example data such as threshold values, quality values, user equipment context, timers, ciphering keys, application to perform the methods herein when being executed on the radio base station 12 or similar.

The embodiments herein for enabling the user equipment 10 to establish the connection may be implemented through one or more processors, such as a processing circuit 604 in the base station 12 depicted in FIG. 6, together with computer program code for performing the functions and/or method steps of the embodiments herein. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

Figure 7:
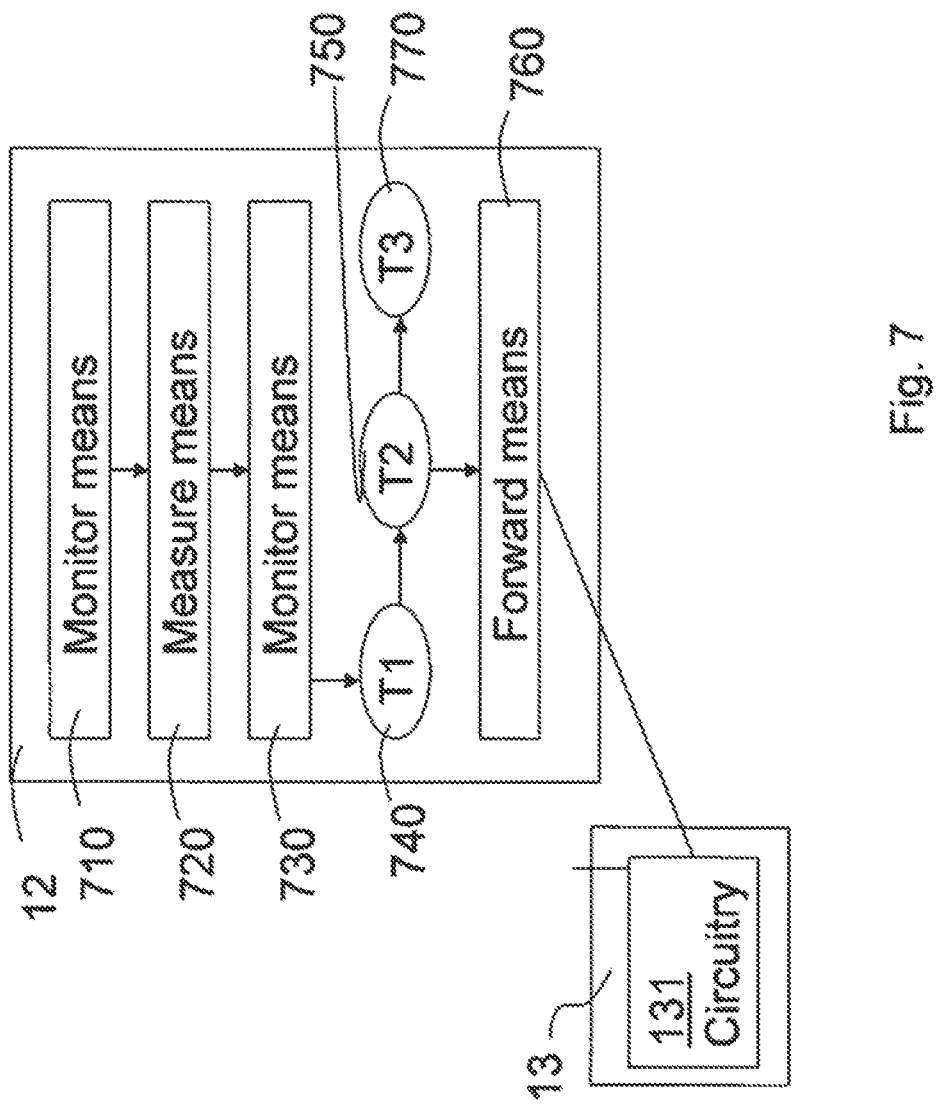
FIG. 7 is a block diagram depicting a radio base station.

FIG. 7 is block diagram depicting an embodiment of the radio base station 12. FIG. 7 discloses means in a base station 12 capable to perform said method:

- means 710 for monitoring the values of CQI, UL SRS, and number of HARQ NACKs received—e.g., digital signal processing circuitry configured to evaluate CQI, UL SRS, and/or HARQ NACK information;
- means 720 for measuring on mobiles in the cell and detecting DL SINR below Threshold_1, or UL SINR below Threshold_2, or #consecutive HARQ NACKS above Threshold_3—e.g., one or more radio receivers and/or signal processing circuitry associated therewith and configured to carry out said measuring and detecting;
- means 730 for starting monitoring the inter-arrival times of DL grants & UL scheduling requests—e.g., signal processing or other computer circuitry configured to control one or more hardware and/or software timers used to carry out the specified timing;
- a first timer T1 740 started after the transmission of a DL grant or UL scheduling request and adapted to initiate after expiry transmission of an UL scheduling grant to the UE and starting of a second timer T2 750;
- a second timer T2 750;
- means 760 for forwarding the UE context to N neighbor cells, or a circuitry 131 controlling a neighbor cell—e.g., a communication interface circuit, such as an inter-base station communication interface, and associated control and processing circuitry for carrying out communications with the neighbor cell;
- a third timer T3 770 during which means 770 in the base station store the UE context and ask for the ciphering keys of the N neighbor cells.

Advantages of embodiments herein imply a faster RLF recovery reducing interruption times to low values.

The radio base station 12 may poll the user equipment 10 in question after having received information of this user equipment 10 interfering severely a neighbor radio base station, i.e. the polling message is triggered by neighbor user equipment interfered by the user equipment. It is thus easy to keep track of which user equipment is interfering: There is already a list of Physical Resource Blocks (PRB) with heavy interference extended via X2. The radio base station 12 is aware of which user equipments create high interference to other cells.

An overhead for signaling may not be so high considering as the user equipment typically ends up in the target cell, e.g. second cell 16 after RLF. Hence, forwarding the user equipment context to 1 or 2 cells, which may be controlled by the same radio base station, may be sufficient.

In Manhattan scenarios, the most extreme cases are the ones where SNR drops 25 dBs within 1-2 seconds; there is hence enough time so as to detect problems in the radio link and inactivity periods.

In case of aggressive HO setting, i.e. probability of ping-pong, the radio base station 12 may keep a copy of the forwarded user equipment context and only release it after the second cell 16, actually the circuitry, has acknowledged (ACK) reception.

According to embodiments herein, an algorithm describes an advanced combination of use of the tools in the radio base station 12 so as to track RLF at the user equipment 10 in a way that the complexity of the radio base station 12 is not increasing considerably. In this case the user equipment context is already available at the cell to which the user equipment transmits a message RRC Connection Reestablishment Request and hence the overall duration of the RLF recovery procedure is significantly reduced.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for p poses of limitation, the scope of the invention being defined by the following claims.

What is claimed is:

1. A method in a radio base station for enabling a user equipment to establish a connection in a radio communications network, the user equipment served in a first cell controlled by the radio base station, the radio base station being in the radio communications network, and wherein the method comprises:
    detecting a failure of a radio link between the user equipment and the radio base station, wherein said detecting comprises:
        tracking a channel quality of the radio link;
        determining at least one of whether the tracked channel quality exceeds an upper threshold value and whether the tracked channel quality is below a lower threshold value;
        monitoring a traffic activity over the radio link when at least one of the tracked channel quality exceeds the upper threshold value and the tracked channel quality is below the lower threshold value; and
        determining that the failure of the radio link is detected when traffic activity falls below an activity threshold, and there is data buffered or protocol activity for the user equipment in the radio base station; and
    forwarding a user equipment context of the user equipment to a circuitry controlling a second cell when the failure is detected, said user equipment context enabling the circuitry controlling the second cell to serve the user equipment and thereby enabling the user equipment to establish the connection in the radio communications network.

2. A method according to claim 1, wherein said monitoring comprises tracing a time between receiving or transmitting a first scheduling message and respectively receiving or transmitting a second scheduling message.

3. A method according to claim 2, wherein determining that the failure of the radio link is detected comprises comparing the traced time with a first time threshold, and wherein forwarding the user equipment context comprises forwarding the user equipment context when the traced time exceeds the first time threshold.

4. A method according to claim 3, wherein the first time threshold comprises an average time between previous consecutive received scheduling messages or previous consecutive transmitted scheduling messages, plus a time offset.

5. A method according to claim 1, wherein said detecting comprises:
    testing the radio link by transmitting a message to the user equipment;
    determining whether a response is received from the user equipment within a predetermined time, and
    detecting the failure if the predetermined time expires before receiving said response.

6. A method according to claim 1, wherein the second cell is a cell with a strongest signal strength of all cells reported from the user equipment.

7. A method according to claim 1, wherein said forwarding comprises forwarding the user equipment context to one or more circuitries controlling a number of cells based on mobility history of other user equipments served in the first cell or interference indications from user equipments within the first cell or other cells.

8. A method according to claim 1, further comprising storing the user equipment context for a set time after forwarding the user equipment context.

9. A method according to claim 8, wherein said storing comprises storing the user equipment context only if the user equipment has handover settings comprising setting values below one or more settings threshold values.

10. A method according to claim 1, further comprising sending a request to the circuitry controlling the second cell requesting security information related to the user equipment.

11. A method according to claim 1, wherein said detecting comprises receiving an indication from the user equipment that indicates radio link failure of the radio link.

12. A radio base station for enabling a user equipment to establish a connection in a radio communications network, the user equipment served in a first cell controlled by the radio base station, the radio base station comprised in the radio communications network, and wherein the radio base station comprises:
    a detecting circuit configured to detect a failure of a radio link between the user equipment and the radio base station, wherein the detecting circuit is configured to:
        track a channel quality of the radio link;
        determine at least one of whether the channel quality exceeds an upper threshold value and whether the channel quality is below a lower threshold value;
        monitor a traffic activity over the radio link when at least one of the tracked channel quality exceeds the upper threshold value and the tracked channel quality is below the lower threshold value; and
        determine that the failure of the radio link is detected when traffic activity falls below an activity threshold, and there is data buffered or protocol activity for the user equipment in the radio base station; and
    a forwarding circuit configured to forward a user equipment context of the user equipment to a circuitry controlling a second cell when the failure has been detected, said user equipment context enabling the circuitry controlling the second cell to serve the user equipment and thereby enabling the user equipment to establish the connection in the radio communications network.

13. A radio base station according to claim 12, wherein the detecting circuit is configured to monitor the traffic activity by tracing a time between receiving or transmitting a first scheduling message and respectively receiving or transmitting a second scheduling message.

14. A radio base station according to claim 13, wherein the detecting circuit is configured to determine that the failure of the radio link is detected by comparing the traced time with a first time threshold, and wherein the forwarding circuit is configured to forward the user equipment context when the traced time exceeds the first time threshold.

15. A radio base station according to claim 14, wherein the first time threshold comprises an average time between previous consecutive received scheduling messages or previous consecutive transmitted scheduling messages, plus a time offset.

16. A radio base station according to claim 12, wherein the detecting circuit is configured to:
    test the radio link by transmitting a message to the user equipment;
    determine whether a response is received from the user equipment within a predetermined time, and
    detect the failure if the predetermined time expires before receiving said response.

17. A radio base station according to claim 12, wherein the forwarding circuit is configured to select the second cell as a cell with a strongest signal strength of all cells reported from the user equipment.

18. A radio base station according to claim 12, wherein the forwarding circuit is configured to forward the user equipment context to one or more circuitries controlling a number of cells based on mobility history of other user equipments served in the first cell or interference indications from user equipments within the first cell or other cells.

19. A radio base station according to claim 12, wherein the radio base station is further configured to store the user equipment context in a memory for a set time after forwarding the user equipment context.

20. A radio base station according to claim 19, wherein the radio base station is configured to store the user equipment context only if the user equipment has handover settings comprising setting values below one or more settings threshold values.

21. A radio base station according to claim 12, wherein the forwarding circuit is further configured to send a request to the circuitry controlling the second cell requesting security information related to the user equipment.

22. A radio base station according to claim 12, wherein the detecting circuit is further configured to detect the failure when receiving an indication from the user equipment indicating radio link failure of the radio link.

* * * * *

UNITED STATES PATENT AND TRADEMARK OFFICE
CERTIFICATE OF CORRECTION

PATENT NO. : 8,965,357 B2
APPLICATION NO. : 12/978007
DATED : February 24, 2015
INVENTOR(S) : Dimou et al.

It is certified that error appears in the above-identified patent and that said Letters Patent is hereby corrected as shown below:

On the title page, item 57, under "ABSTRACT", in Column 2, Line 3, delete "network" and insert -- network. --, therefor.

In the specification

In Column 1, Line 10, delete "TECHNICAL HELD" and insert -- TECHNICAL FIELD --, therefor.

In Column 1, Line 58, delete "order" and insert -- order to --, therefor.

In Column 2, Line 3, delete "Power Quality" and insert -- Quality --, therefor.

In Column 5, Line 44, delete "ping pang" and insert -- ping pong --, therefor.

In Column 5, Line 63, delete "ping-pang" and insert -- ping-pong --, therefor.

In Column 5, Line 64, delete "ping- pang" and insert -- ping- pong --, therefor.

In Column 6, Line 56, delete "station" and insert -- station 13 --, therefor.

In Column 10, Line 33, delete "cell ray" and insert -- cell may --, therefor.

In Column 11, Line 28, delete "station 2" and insert -- station 12 --, therefor.

In Column 11, Line 40, delete "(RACED" and insert -- (RACH) --, therefor.

In Column 12, Line 66, delete "network" and insert -- network. --, therefor.

In Column 14, Line 34, delete "(PRB)" and insert -- (PRBs) --, therefor.

In Column 14, Line 43, delete "SNR" and insert -- SINR --, therefor.

In Column 14, Line 66, delete "p poses" and insert -- purposes --, therefor.

Signed and Sealed this
Seventeenth Day of November, 2015

Michelle K. Lee
*Director of the United States Patent and Trademark Office*